United States Patent
Ray et al.

(10) Patent No.: US 7,750,843 B2
(45) Date of Patent: Jul. 6, 2010

(54) WEAK SIGNAL ACQUISITION

(75) Inventors: Jayanta Kumar Ray, Bangalore (IN); Nagaraj Shivaramaiah Channarayapatna, Bangalore (IN); Sameet Mangesh Deshpande, Bangalore (IN)

(73) Assignee: Accord Software & Systems Pvt. Ltd, Bangalore, Karnataka (IN)

(*) Notice: Subject to any disclaimer, the term of this patent is extended or adjusted under 35 U.S.C. 154(b) by 0 days.

(21) Appl. No.: 11/439,103

(22) Filed: May 23, 2006

(65) Prior Publication Data

US 2007/0085736 A1    Apr. 19, 2007

(30) Foreign Application Priority Data

Oct. 14, 2005    (IN)    .................. 1478/CHE/2005

(51) Int. Cl.
G01S 1/00    (2006.01)
(52) U.S. Cl. .................................. 342/357.02
(58) Field of Classification Search ................
342/357.01–357.17
See application file for complete search history.

(56) References Cited

U.S. PATENT DOCUMENTS

| 6,236,354 B1 | 5/2001 | Krasner |
| 6,680,695 B2 | 1/2004 | Turetzky et al. |
| 2002/0050944 A1* | 5/2002 | Sheynblat et al. ....... 342/357.06 |
| 2002/0064209 A1* | 5/2002 | Turetzky et al. ............. 375/142 |
| 2004/0196183 A1* | 10/2004 | Roh ...................... 342/357.12 |
| 2005/0032513 A1 | 2/2005 | Norman et al. |
| 2008/0316096 A1* | 12/2008 | Bochkovskiy et al. . 342/357.12 |

* cited by examiner

*Primary Examiner*—Thomas H Tarcza
*Assistant Examiner*—Nga X Nguyen
(74) *Attorney, Agent, or Firm*—Ashok Tankha; IP Legal Services (57) ABSTRACT

A method for acquisition of a weak signal from a satellite in the presence of a strong interfering signal from another satellite is disclosed. The method encompasses identifying the auto-correlation peak due to the weak satellite signal from the cross correlation peaks due to the strong satellite signal. This invention presents a method and apparatus of acquiring a weak satellite signal in the presence of a strong interfering satellite signal in a receiver by two techniques, namely, the millisecond boundary correlation histogram method, and the frequency response correlation histogram method. Both the techniques distinguish between the correlation characteristics for auto-correlation and cross-correlation. The apparatus presented in the invention implements the methods of weak satellite signal acquisition in presence of a strong interfering satellite signal in a pseudorandom noise (PRN) receiver.

12 Claims, 11 Drawing Sheets

| MODE 1 | MODE 2 | MODE 3 | MODE 4 | MODE 5 |
|---|---|---|---|---|
| $F_1$ $C_1(0-N)$ | $F_1$ $C_1(0-N/2)$ | $F_1$ $C_1(0-N/4)$ | $F_1$ $C_1(0-N/8)$ | $F_1$ |
| | | | | $F1 + F_{STEP}$ |
| | | | $F1 + F_{STEP}$ | $F1 + 2F_{STEP}$ |
| | | | $C_1(0-N/8)$ | $F1 + 3F_{STEP}$ |
| | | $F1 + F_{STEP}$ $C_1(0-N/4)$ | $F1 + 2F_{STEP}$ $C_1(0-N/8)$ | $F1 + 4F_{STEP}$ |
| | | | | $F1 + 5F_{STEP}$ |
| | | | $F1 + 3F_{STEP}$ $C_1(0-N/8)$ | $F1 + 6F_{STEP}$ |
| | | | | $F1 + 7F_{STEP}$ |
| | $F1 + F_{STEP}$ $C_1(0-N/2)$ | $F1 + 2F_{STEP}$ $C_1(0-N/4)$ | $F1 + 4F_{STEP}$ $C_1(0-N/8)$ | $F1 + 8F_{STEP}$ |
| | | | | $F1 + 9F_{STEP}$ |
| | | | $F1 + 5F_{STEP}$ $C_1(0-N/8)$ | $F1 + 10F_{STEP}$ |
| | | | | $F1 + 11F_{STEP}$ |
| | | $F1 + 3F_{STEP}$ $C_1(0-N/4)$ | $F1 + 6F_{STEP}$ $C_1(0-N/8)$ | $F1 + 12F_{STEP}$ |
| | | | | $F1 + 13F_{STEP}$ |
| | | | $F1 + 7F_{STEP}$ $C_1(0-N/8)$ | $F1 + 14F_{STEP}$ |
| | | | | $F1 + 15F_{STEP}$ |

WEAK SIGNAL ACQUISITION

BACKGROUND OF THE INVENTION

The invention disclosed herein, in general, relates to a pseudorandom noise receiver and specifically relates to a method of differentiating between an auto-correlated weak signal and a cross-correlated product of weak and strong signals in a receiver used in global positioning system (GPS).

GPS satellites transmit signals to a universal receiver with a unique code called the coarse acquisition (C/A) code. The C/A code belongs to the family of gold code having a code length of 1023 chips. Signals from the satellites are coded with gold codes and transmitted at a chip rate of 1.023 MHz, with a period of 1 millisecond, with the code repeating every millisecond. Each satellite has a unique code for reception at the receiver. In correlation techniques, the incoming satellite signal is multiplied with a locally generated code. For example, the incoming satellite signal comprises a carrier of 1575.42 MHz, navigation data bits of 50 Hz and a coarse acquisition (C/A) code of 1.023 MHz.

Consider a case where the incoming signal from the satellite in a GPS receiver comprises a mix of weak and strong signals and where the weak signal is the desired signal and the strong signal is non-desired signal. There is a need to accurately differentiate between an auto-correlated weak signal and a cross-correlated product of weak and strong signals in a global positioning systems receiver. Interferences from the undesirable strong signals result in loss of valuable data transmitted from the satellite.

SUMMARY OF THE INVENTION

The proposed invention provides a method and an apparatus to detect a weak pseudorandom noise (PRN) signal in the presence of a strong PRN signal, where the weak signal is partially masked by the strong signal in a PRN receiver. The proposed invention uses a special chip-frequency-time multiplexed (CFT) correlator for identification of the auto-correlation peak due to the weak satellite signal from the cross-correlation peaks due to the strong satellite signal by employing two techniques, namely the millisecond boundary correlation histogram method, and the frequency response correlation histogram method. The two methods can be used independently or in parallel to increase the efficiency of the receiver, so that even if one method fails, the other method yields the desired results.

The proposed invention uses an apparatus that employs the above-mentioned techniques for weak signal acquisition is a PRN ranging GPS receiver. The PRN ranging receiver consists of a radio frequency (RF) front end, a chip-frequency-time multiplexed (CFT) correlator and individually programmable large correlator and an embedded processor. The CFT correlator provides multiple correlation peaks within the code chip delay search range, and also allows an increase in the signal integration period dynamically, thereby enabling weak signal detection using the aforesaid techniques. This architecture of the GPS receiver is suitable for a variety of applications including E-911 and car navigation, for reliable signal acquisition in indoor and other constrained environments.

In the millisecond boundary correlation histogram method, the strong satellite signal that causes cross correlation is first identified. The incoming GPS signal is correlated with the locally generated code for the satellite, corresponding to the strong signal, and a millisecond boundary correlation histogram plot is drawn. Then, the locally generated code representing the weak satellite signal is correlated with the incoming GPS signal at the search range code delays and integrated over an extended period of time, until the auto-correlation peak and the cross-correlation peaks stand out from the noise. Subsequently, millisecond boundary correlation histograms are plotted at each chip delay where auto-correlation or cross-correlation peaks occur. One plot amongst the multiple histograms has a unique slope characteristic compared to the remaining histograms. This unique histogram represents the auto-correlation peak.

In the frequency response correlation histogram method, the signal with higher signal strength is identified as the strong satellite signal. A frequency response correlation histogram is generated for the strong satellite signal by beating the local code and the local carrier against the incoming GPS signal, wherein the local carrier frequency is varied around the tracking frequency in small steps. Then, the locally generated code for the weak signal is correlated with the incoming GPS signal at predefined code delays and integrated over an extended period of time, until the auto-correlation peak and cross-correlation peaks stand out from the noise. Subsequently, the frequency response correlation histogram is generated for each chip delay in which auto-correlation or cross correlation peaks occur. One plot amongst the multiple frequency response correlation histograms has a unique characteristic compared to the remaining histograms, which represents the auto-correlation peak.

This invention allows detection of a weak signal when it is partially masked by a strong signal and provides an effective solution for weak signal acquisition even when the weak and the strong signals arrive at the GPS receiver at the same Doppler frequency.

The method disclosed herein also searches for progressively weaker and weaker signals by continuous integration and peak examination, without discarding the prior data, thereby improving the search efficiency for weak signal acquisition in the GPS receiver.

Also, in order to set the duration of integration in the correlation process, the CFT correlator does not require any knowledge of the approximate signal strength of a pseudorandom noise (PRN) signal. Hence, the technique of millisecond boundary correlation histogram method and frequency response correlation histogram method disclosed herein are not affected by dynamic variations in the signal strength during signal acquisition at the GPS receiver.

DETAILED DESCRIPTION OF THE INVENTION

The method disclosed herein presents a method of acquiring a weak satellite signal in the presence of a strong interfering satellite signal at a GPS receiver, using two techniques, namely the millisecond boundary correlation histogram method and the frequency response correlation histogram method. Both the techniques distinguish between the correlation characteristics of auto-correlation and cross-correlation peaks. A chip-frequency-time multiplexed (CFT) correlator applies the millisecond boundary correlation histogram and frequency response correlation histogram methods to distinguish the auto-correlation peak from the cross-correlation peaks.

Figure 1:
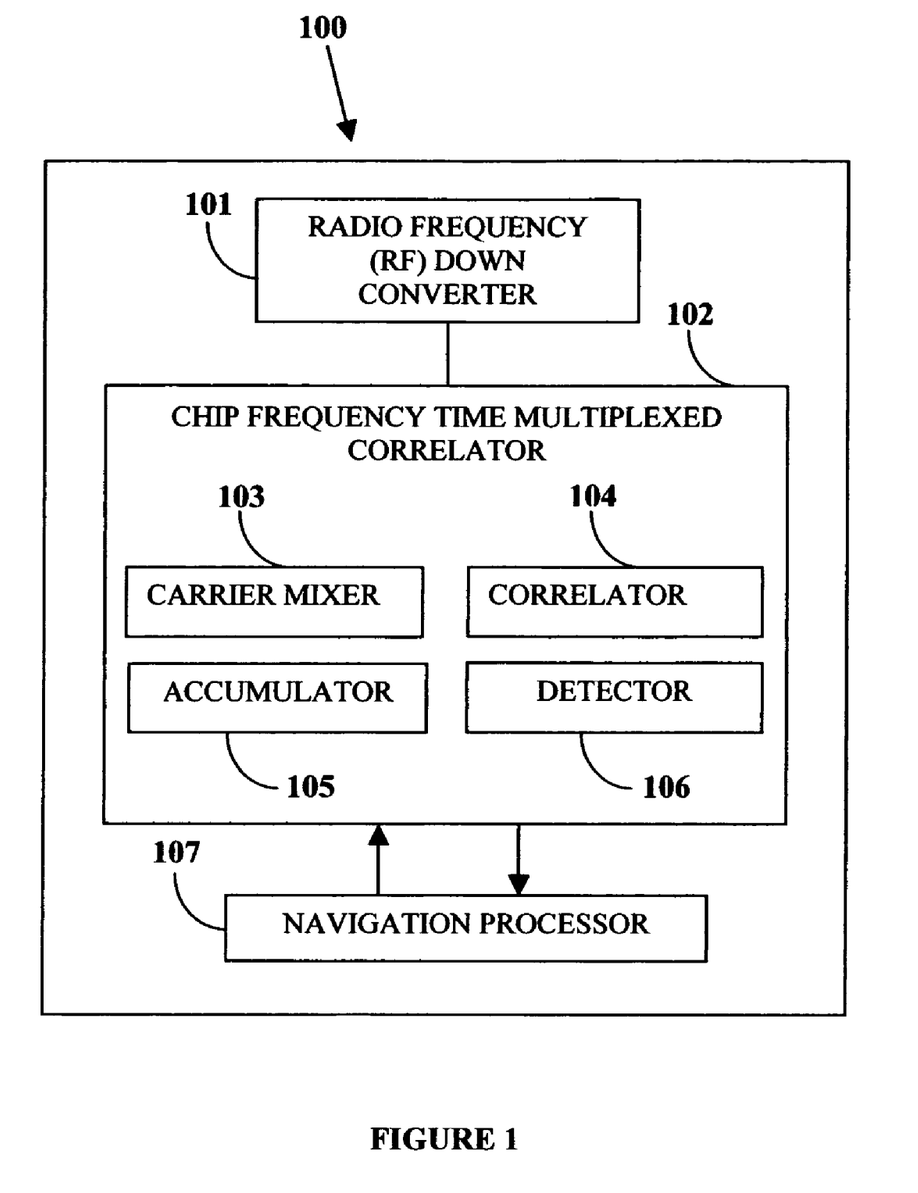
FIG. 1 illustrates the block diagram of a pseudorandom noise receiver (PRN receiver).

FIG. 1 illustrates the block diagram of a PRN receiver, such as a GPS receiver. The GPS receiver 100 consists of a radio frequency (RF) down converter 101 that down converts the high frequency RF signal to an intermediate frequency (IF) signal, rejects the unwanted frequency bands, and provides sufficient signal amplification. The IF signal is processed in a chip-frequency-time (CFT) multiplexed correlator 102, where it is mixed with a locally generated carrier in the carrier mixer 103, correlated with locally generated code in the correlator 104. The correlation values are integrated for a desired integration period in the accumulator 105. A post correlation processor performs extended integration, if required, and then detects the correlation peak for signal acquisition in the detector 106. A navigation processor 107 interacts with the CFT correlator and provides necessary information to perform a faster satellite signal search. The navigation processor 107 takes the output of the post-integration detector 106 for final detection and tracking of the satellite signal.

Figure 2:
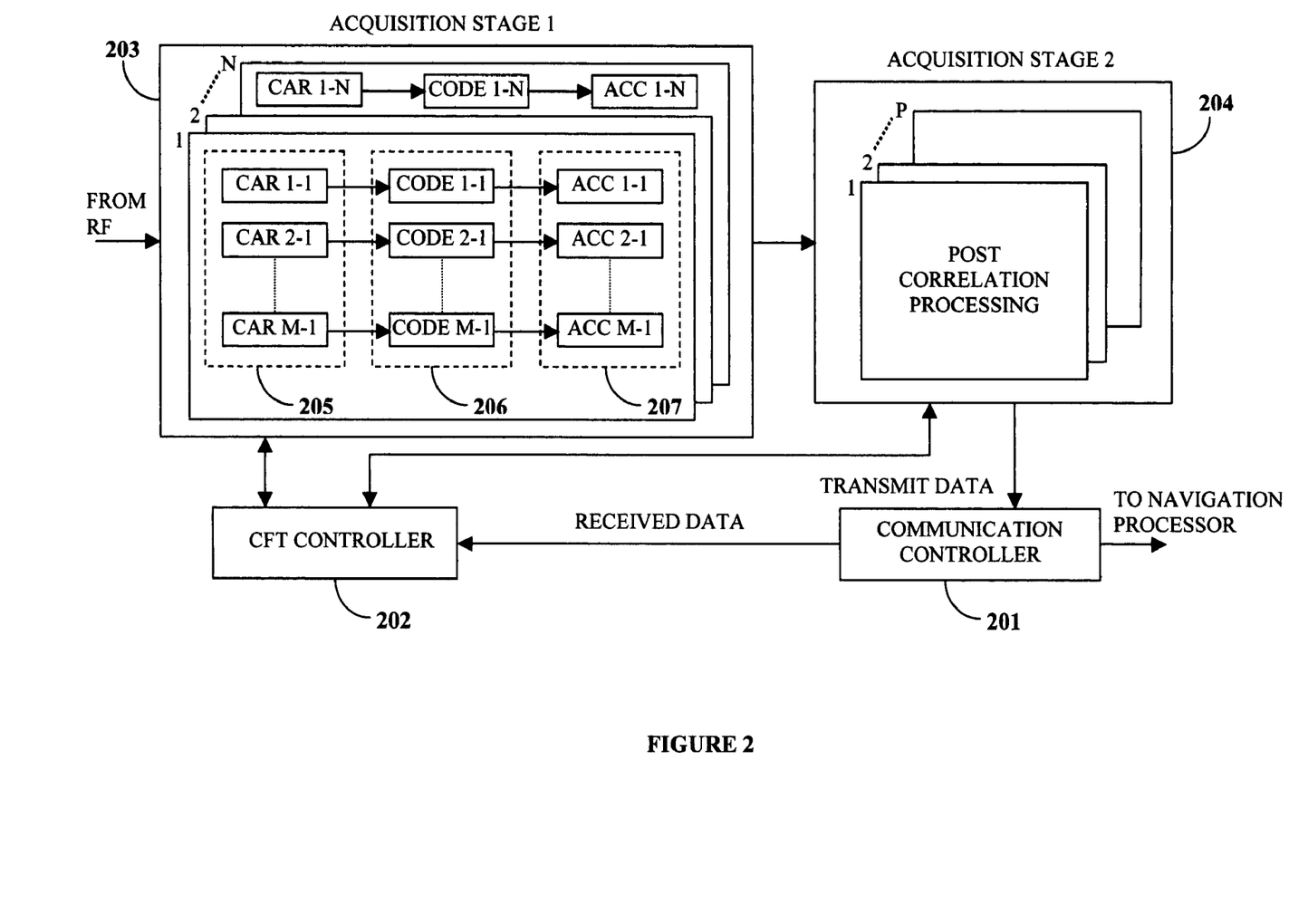
FIG. 2 illustrates a block diagram of the chip frequency timing (CFT) correlator.

FIG. 2 illustrates the block diagram of a CFT correlator that is used for weak satellite signal acquisition in the presence of an interfering strong satellite signal. The communication controller 201 receives information regarding weak signal satellite identification (ID), Doppler frequency search range and chip delay search range from the navigation processor 107. The CFT controller 202 that runs a state machine receives the information from the communication controller 201 and programs the chip-frequency-time multiplexed correlator (CFT) array 203. The CFT correlator array 203 contains an MxN carrier mixer 205, correlator and accumulator blocks 207. The CFT controller programs the MxN local carrier generator and mixer 205 with the weak signal Doppler frequency search range and MxN local code generator 206 with the weak signal code delay search range for simultaneous chip-frequency search. The MxN accumulator 207 accumulates the correlation values for the desired duration. Further, it is also possible to run this MxN correlator array in a time-multiplexed fashion for a different set of frequency range and code delay range thereby re-using the hardware more efficiently and enabling faster search of wider frequency and code delay ranges.

Detection of a weak satellite signal requires the accumulation of correlation values for an extended period of time, for example, in the order of several seconds. This accumulation is performed in post correlation processing block 204. Further, post correlation processing allows the continuous accumulation of correlation values and continuous examination of the correlation peaks, resulting in accumulation of correlation values only until the correlation peaks stand out from the noise floor. In this process, all the prior data is utilized, thereby avoiding wastage of valuable time and resources. Multiple correlation peaks are detected in the simultaneous chip-frequency-time multiplexed search and this information is communicated to the navigation processor 107 through the communication controller 201.

At the GPS receiver 100, the GPS signal consists of a combination of satellite signals from all the visible satellites. For various reasons including space loss, local obstructions, etc., some of the satellite signals may be significantly weaker compared with some other satellite signals in the incoming signal to the GPS receiver. At the GPS receiver 100, the pre-known code for the desired satellites are generated and correlated with the incoming GPS signal. An auto-correlation occurs when the locally generated code is correlated with the same code coming from the satellite in the incoming GPS signal. A cross-correlation occurs when the locally generated code is correlated with the different codes coming from various other satellites in the incoming GPS signal. There are multiple cross-correlation peaks but only one auto-correlation peak. These cross-correlation peaks hinder the process of weak auto-correlated signal acquisition. The GPS receiver 100 has to differentiate between an auto-correlated peak of the desired satellite signal and cross-correlated peaks of an interfering signal from a different satellite.

Consider two signals transmitted from two different satellites arriving at the GPS receiver 100. The two satellite signals are coded uniquely and transmitted. Both the satellite signals arrive at the GPS receiver. Assume that one of them arrives through the roof and the other through a window at the GPS receiver. Due to the impact of Doppler shifts, consider the case where the two satellite signals arrive at the receiver at comparable Doppler frequencies.

Assume that the satellite signal coming through the roof is attenuated, in the order of 20-25 dB and is therefore received as the weak satellite signal. Assume further that the signal from the satellite coming through the window is not attenuated and therefore, in comparison, is received as a strong satellite signal. Since both the strong and the weak satellite signals have about the same Doppler frequency, the strong satellite signal interferes with the weak satellite signal during its acquisition.

Auto-correlation peaks are generated as a result of correlation of the weak satellite signal with the locally generated code for that satellite, representing the desired satellite signal. Cross-correlation peaks are generated as a result of correlation of strong satellite signal with the locally generated code for the weak satellite, representing the undesired satellite signal. Typically, when the signal strengths of all the incoming satellite signals are the same or nearly the same, the auto-correlation peak is about 24 dB higher than that of the cross-correlation peaks. However, in the case under consideration, the strengths of auto-correlation and cross-correlation peaks are comparable because of the 20-25 dB attenuation of the desired weak satellite signal, compared to minimal attenuation of the strong satellite signal.

Figure 3A:
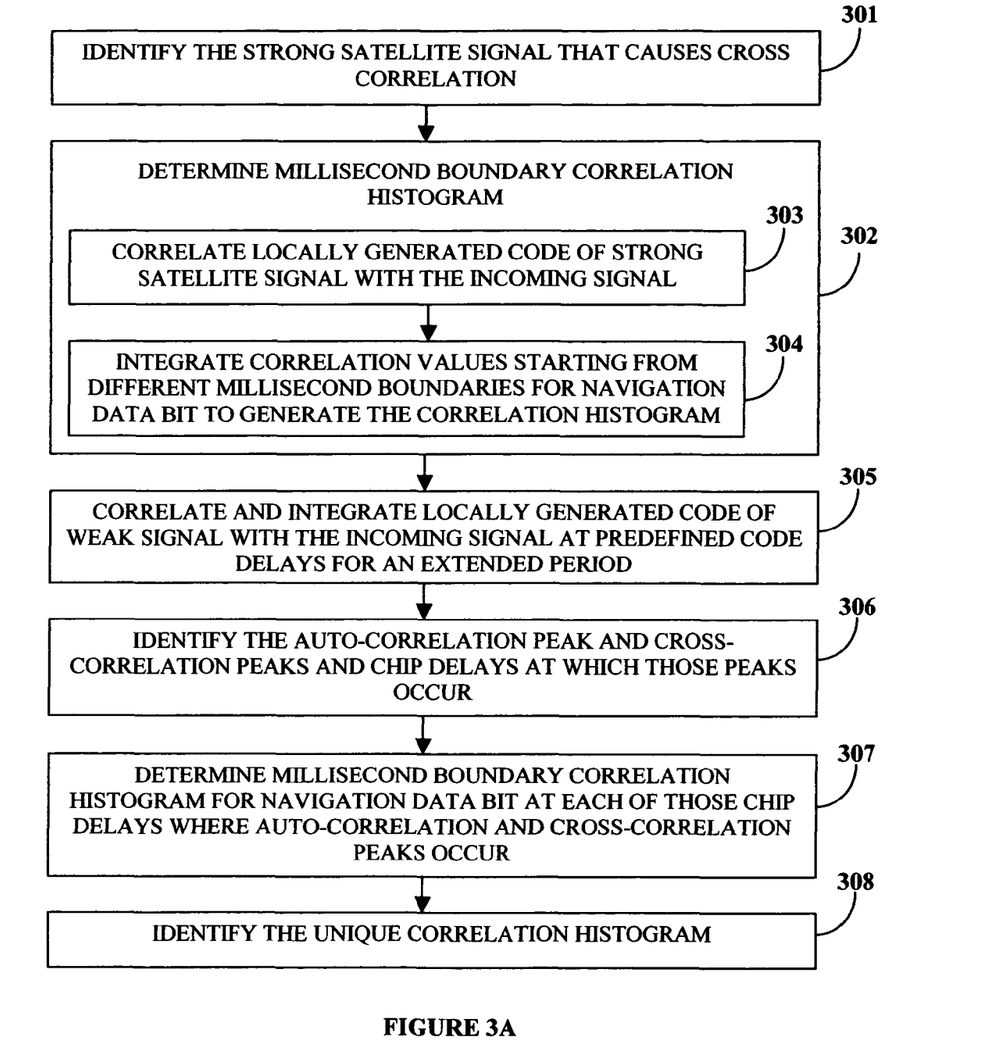
FIG. 3A illustrates the millisecond boundary correlation histogram method for the acquisition of a weak satellite signal in a GPS receiver in the presence of a strong interfering satellite signal.

FIG. 3A illustrates the millisecond boundary correlation histogram method for the acquisition of a weak satellite signal in a GPS receiver 100 in the presence of a strong interfering satellite signal. The strong satellite signal that causes cross-correlation is identified 301. The satellite signal with a greater strength compared to another satellite signal having a lower strength and at about the same Doppler frequency of the signal is termed the strong satellite signal. A millisecond boundary correlation histogram for the identified strong satellite signal is plotted for a pre-defined navigation data bit period, for example, 20 millisecond (msec) by correlating the locally generated code representing the strong satellite signal with the incoming satellite signal 302. The locally generated code representing the strong satellite signal is correlated with the incoming satellite signal with the code delay at which the correlation peak occurs 303. The correlation values are integrated, starting from different millisecond boundaries for navigation data bit at which auto-correlation peak occurs, to generate the correlation histogram 304.

While the weak satellite signal is acquired at about the same Doppler frequency of the strong satellite signal, a search is performed for all the code delay ranges at which the weak signal is expected to attain a correlation peak. This code delay is also called a predefined chip delay or predefined search window.

The locally generated code of the weak satellite signal is correlated with the incoming signal 305. The process of detection of a weak satellite signal requires accumulation of correlation values for an extended period in the order of several seconds, which is performed in the post correlation processing block 204. Multiple correlation peaks are detected in the simultaneous chip-frequency-time multiplexed search 306 and this information is communicated to the navigation processor 107 through the communication controller 201.

All the correlation peaks have similar characteristics except the auto-correlation peak that is generated due to the weak satellite signal. One of the characteristics of the cross-correlation peaks is the correlation histogram pattern at the millisecond boundary for navigation data, and that characteristic matches with the strong satellite's auto-correlation peak. One of these peaks is an auto-correlation peak due to the weak satellite signal and this peak has a different characteristic compared to the cross-correlation peak of the strong satellite signal. One of the characteristics of the auto-correlation peak is the correlation histogram pattern at millisecond boundary for navigation data, and that characteristic is generally different from that of the cross-correlation peaks due to the strong signals. The pattern discussed above refers to the position of the correlation peak of the histogram.

A correlation histogram is drawn for all the correlation peaks by integrating the correlation values for the extended integration period, and by delaying the start of integration by 1 millisecond each time until the end of the navigation data bit 307. The millisecond boundary correlation histogram is examined for all the correlation peaks, and the only histogram that has a different pattern compared to the remaining peaks 308 is identified. The correlation peak corresponding to that identified correlation histogram is the auto-correlation peak due to the weak satellite signal.

Figure 3B:
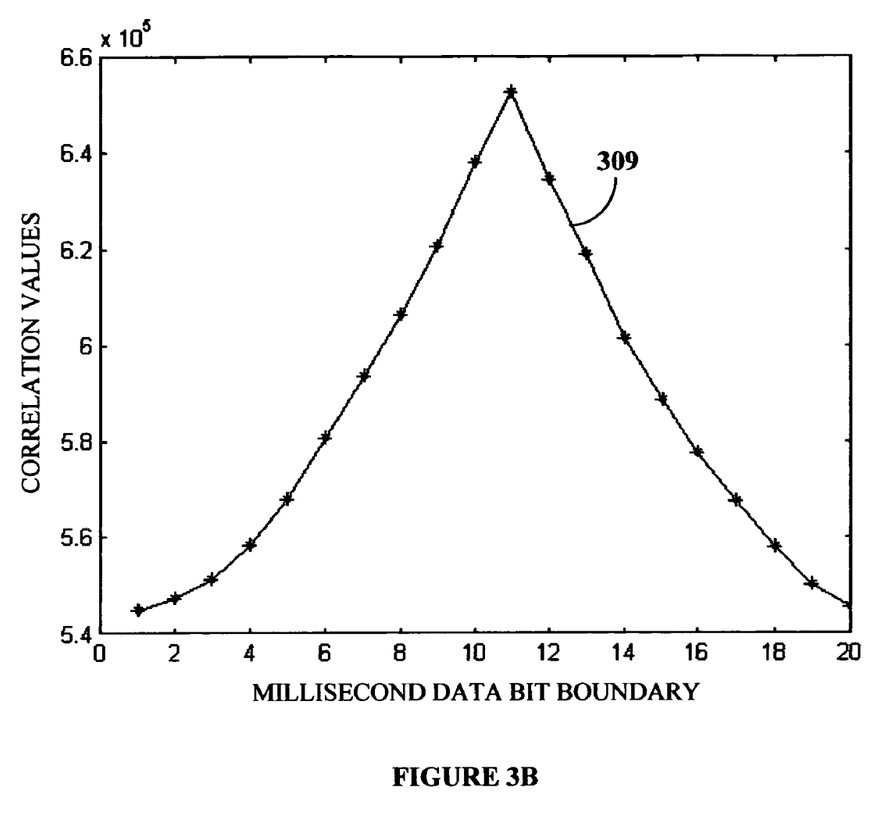
FIG. 3B illustrates an example wherein a strong satellite signal millisecond boundary correlation histogram is generated by correlating the locally generated code representing the strong satellite signal with the incoming GPS signal.

FIG. 3B illustrates an example where the millisecond boundary correlation histogram of the strong satellite signal is generated by correlating the incoming satellite signal with the locally generated code representing the strong satellite signal. This correlation histogram 309 generates the auto-correlation peak of the strong satellite signal.

Figure 3C:
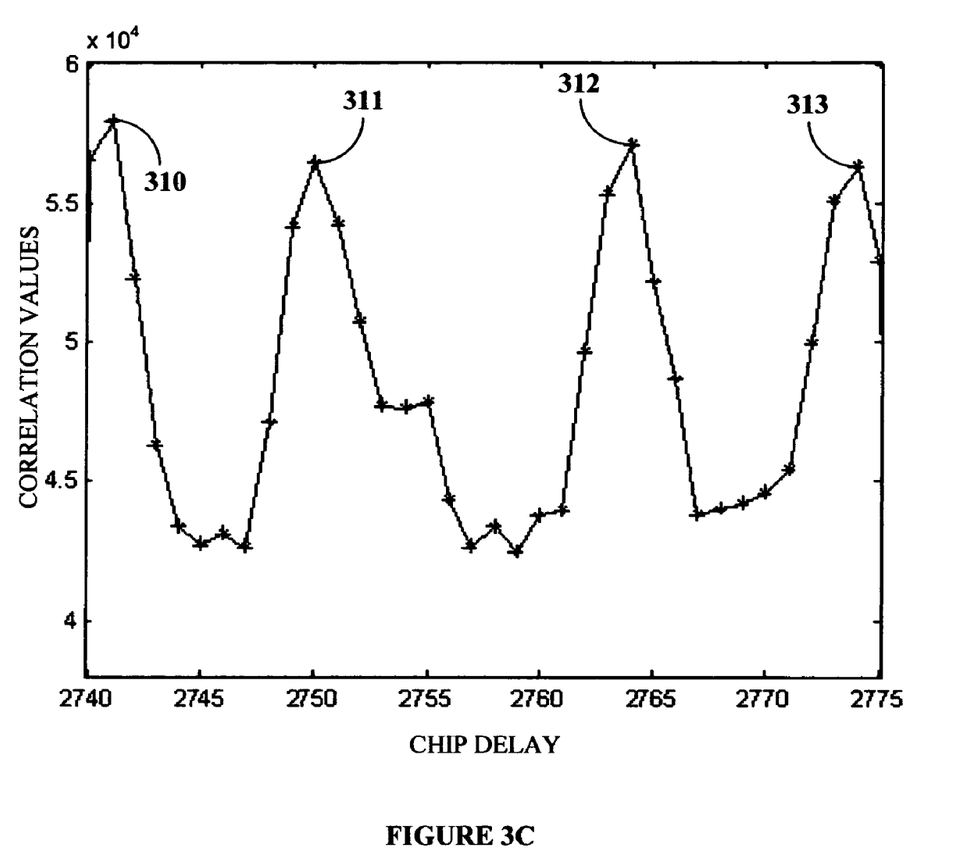
FIG. 3C illustrates an example wherein as a result of extended correlation integration at predefined chip delays, the auto-correlation peak due to weak satellite signal and cross-correlation peaks due to strong satellite signal stand out from the noise.

FIG. 3C illustrates an example where as a result of an extended correlation integration performed using CFT correlator 102 at predefined chip delays, the auto-correlation peak due to the weak satellite signal and the cross-correlation peaks due to the strong satellite signal stand out from the noise. Due to the large integration period, the noise floor is lower compared to the correlation peaks. In the example, peaks 310, 311, 312 and 313 are identified in the search window at sample delays 2741, 2750, 2764 and 2774 respectively, at a sampling frequency of 4.7 MHz and code frequency of 1.023 MHz. One of these peaks is due to auto-correlation, while the remaining peaks are due to cross-correlation. Amplitudes of all the peaks are comparable and therefore the auto-correlation peak is indistinguishable from the cross-correlation peaks.

Figure 3D:
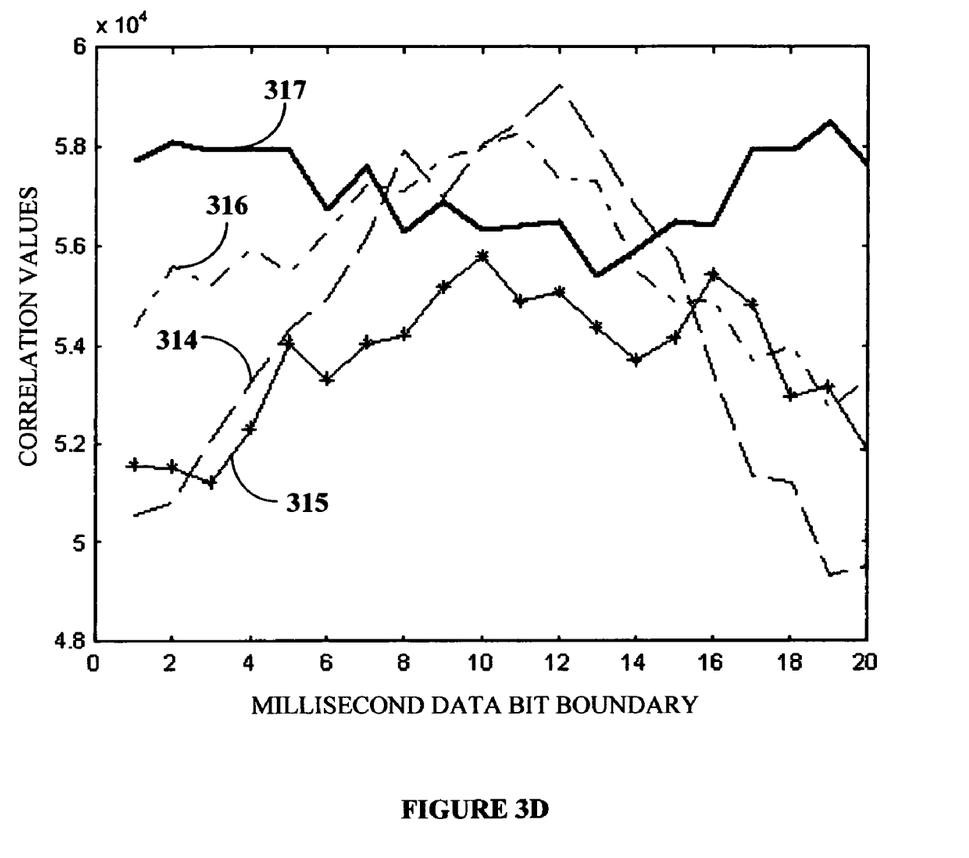
FIG. 3D illustrates an example of millisecond boundary correlation histogram for navigation data at each chip delay where auto-correlation and cross-correlation peaks occur in FIG. 3C.

FIG. 3D illustrates an example of millisecond boundary correlation histogram for navigation data at each chip delay for the auto-correlation and cross-correlation peaks shown in FIG. 3C. In this example, correlation histograms 314, 315, 316 and 317 are plotted for correlation peaks 310, 311, 312 and 313 respectively at sample delays 2741, 2750, 2764 and 2774 respectively. It is observed that correlation histograms 314, 315 and 316 have a similar pattern, while 317 has a pattern different from the remaining histograms. Particularly, correlation histograms 314, 315 and 316 have the maximum value in the vicinity of $11^{th}$ millisecond in the millisecond data bit boundary (X-axis), whereas the correlation histogram 317 has a maximum value at the $19^{th}$ millisecond. It is also observed that correlation histograms 314, 315 and 316 have a pattern that closely resembles that of the correlation histogram 309 illustrated in FIG. 3B. From these observations, it can be concluded that the correlation histograms 314, 315 and 316 are due to the strong signal's cross-correlation and therefore correlation peaks 310, 311 and 312 are due to the strong-signal and more importantly, the correlation peak 313 is due to the weak signal and is the desired auto-correlation peak.

Figure 4A:
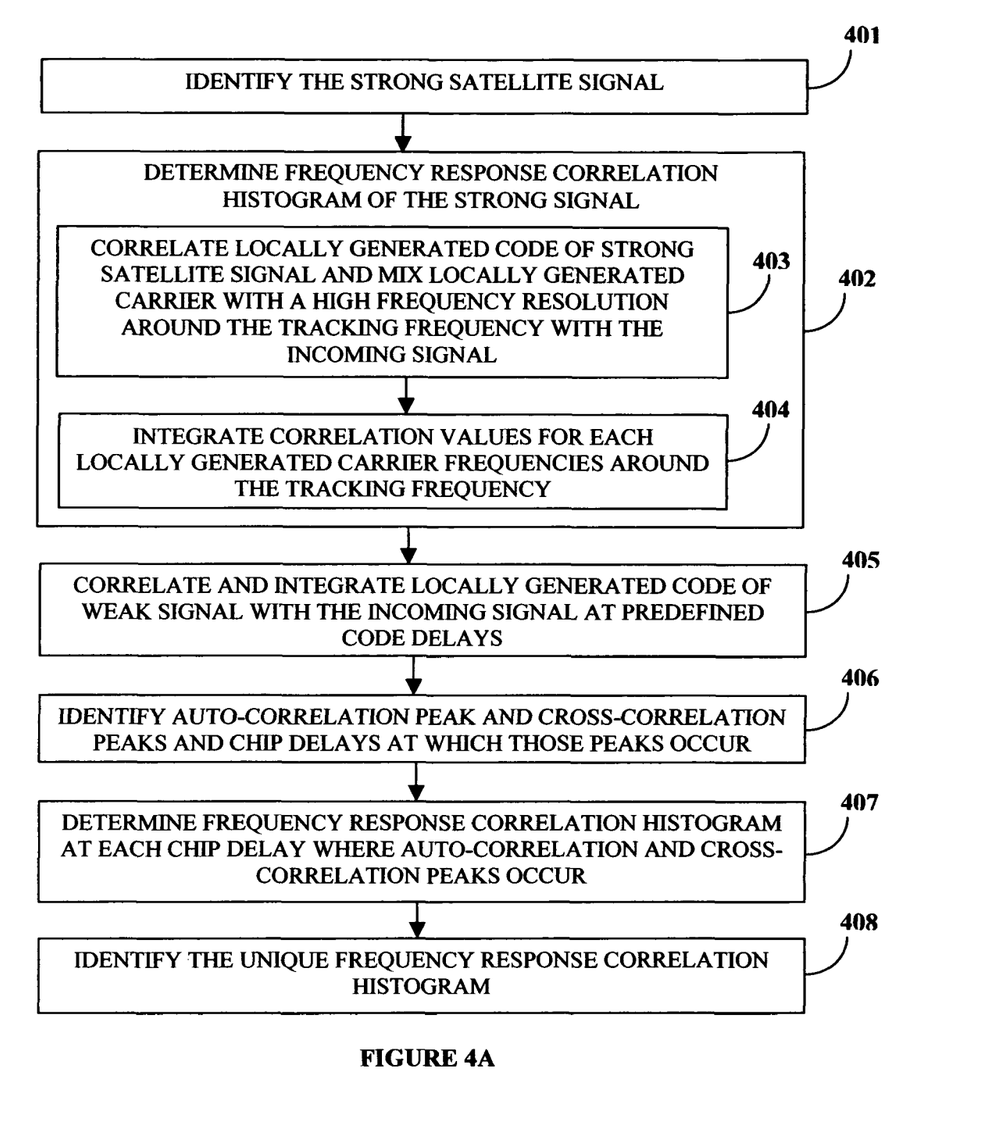
FIG. 4A illustrates a method of weak satellite signal acquisition in a GPS receiver in the presence of an interfering strong satellite signal using the frequency response correlation histogram method.

FIG. 4A illustrates a method of acquisition of a weak signal from a satellite in the presence of a strong interfering signal from another satellite using a frequency response correlation histogram method. The signal with a higher strength and at a Doppler frequency close to another satellite signal with a comparatively lower strength is referred to as the strong satellite signal. This strong satellite signal is first identified 401. A frequency response correlation histogram is plotted at the chip delay and Doppler frequency at which the strong signal is acquired 402. A correlation value is obtained by mixing the local carrier with the incoming signal and correlating the locally generated code for the strong satellite with the incoming signal 403. The frequency response correlation histogram is drawn by changing the local carrier at small steps at around the tracking frequency and at the code chip delay at which the signal is acquired 404.

While acquiring the weak signal at about the same Doppler frequency as that of the strong signal, a search is performed at the estimated code chip delays at which the correlation peak is expected to occur. The locally generated code of the weak satellite signal is correlated with the incoming satellite signal at different chip delays within the search window, using the CFT correlator 203. Integration is performed for an extended period of time in the post correlation processor 204 until the correlation peaks stand out from the noise floor 405. All the correlation peaks are identified by the post correlation processor 204. The correlation peaks are generated by auto-correlation of the weak satellite signal and cross-correlation of the strong satellite signal 406. All these peaks are cross-correlation peaks due to the strong satellite signal, and have similar characteristics except for one peak. One of the characteristics is the profile of the frequency response correlation histogram around the tracking frequency. The CFT correlator through its various configuration modes generates the correlation values for different frequencies and chip delays.

Figure 4B:
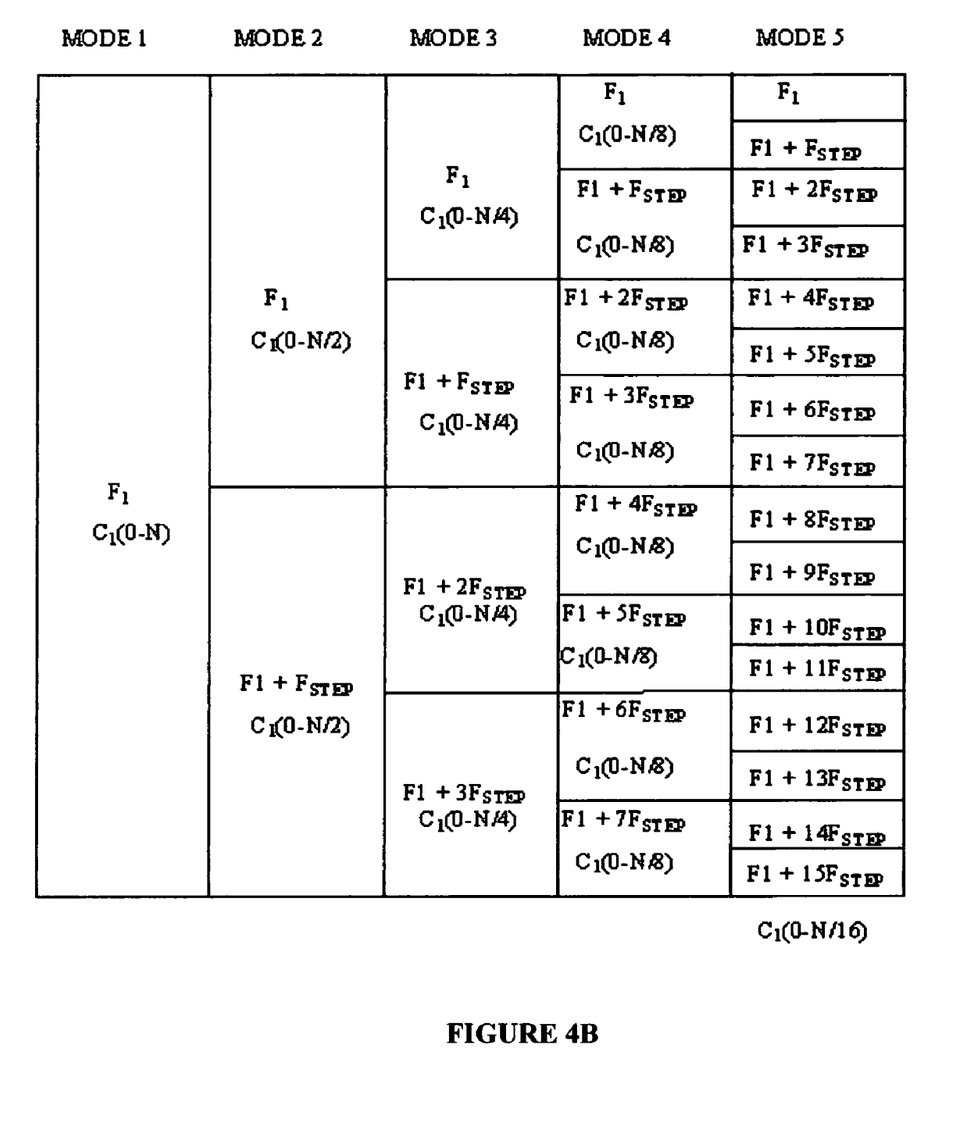
FIG. 4B illustrates an example of the chip frequency sharing methodology in the CFT correlator.

FIG. 4B illustrates an example of the chip frequency sharing methodology in the CFT correlator. Hardware resource for N blocks is shared between chip delay searches and Doppler frequency searches. In MODE 1, all the N blocks generate the same Doppler frequency and N chip delay searches which allows a parallel search of N chips at the same Doppler frequency to be performed. In MODE 2, the first half of the N blocks generate one Doppler frequency and the second half of N blocks generate another Doppler frequency, which is offset from that of the first N blocks by $F_{STEP}$. $F_{STEP}$ is the frequency search resolution of the frequency response histogram for weak signal acquisition. In this mode, parallel search of N/2 chips and two Doppler frequencies can be performed. Other modes, MODE 3, MODE 4, MODE 5, etc., also offer versatile programming and parallel code and Doppler search capabilities. This architecture enables search in different frequency steps and chip delays simultaneously, thereby effectively implementing the weak signal acquisition techniques.

Frequency response correlation values are obtained by programming the CFT correlator 102, using one of the available modes. The correlation histogram is drawn for all the chip delays at which correlation peaks occurred by integrating the correlation values for the extended integration period, which are in the order of a few seconds and for different small deviations of local carrier frequencies around the tracking frequency 407. The frequency response correlation histogram is examined for all the correlation peaks, and the frequency response correlation histogram that has a different pattern compared to the remaining patterns 408 is identified. The correlation peak corresponding to that correlation histogram is the auto-correlation peak due to the weak signal.

Figure 4C:
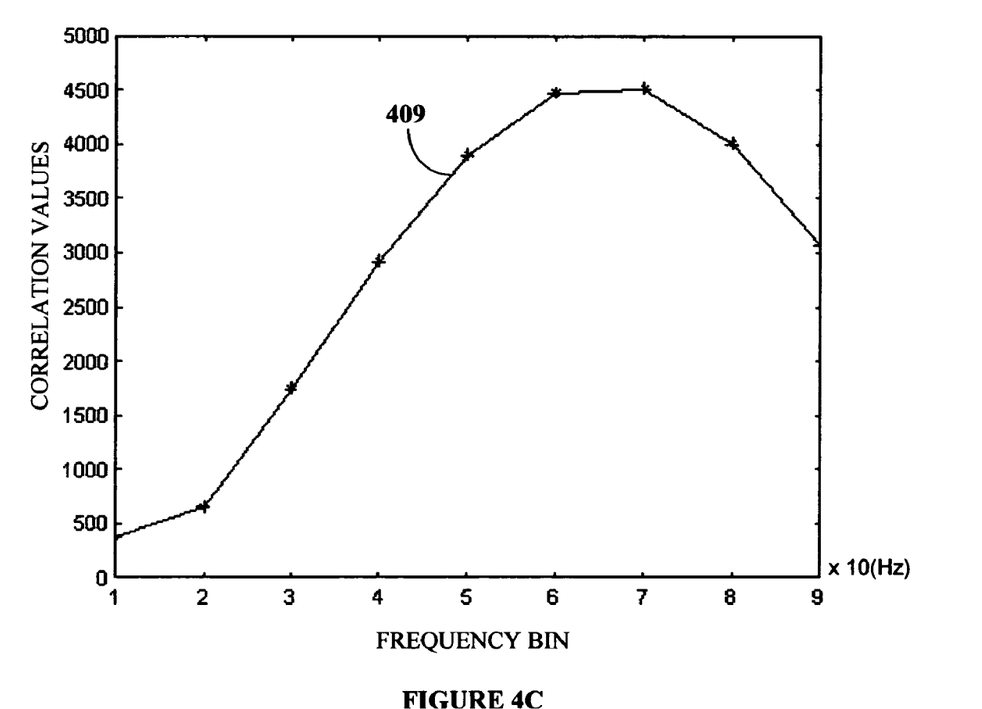
FIG. 4C illustrates an example of a frequency response correlation histogram generated from the correlation of the strong satellite signal with the incoming GPS signal, generated at a high frequency resolution around the tracking frequency

FIG. 4C illustrates the frequency response correlation histogram obtained by mixing local carrier with the incoming signal and correlating local code of the satellite generating the strong satellite with the incoming signal for various carrier frequencies around the tracking frequency 409. It is observed that the correlation histogram peak occurs in the vicinity of the $7^{th}$ bin, which is at a distance of 70 Hz (bin size equal to 10 Hz) from the beginning of the frequency search window in the X-axis.

Figure 4D:
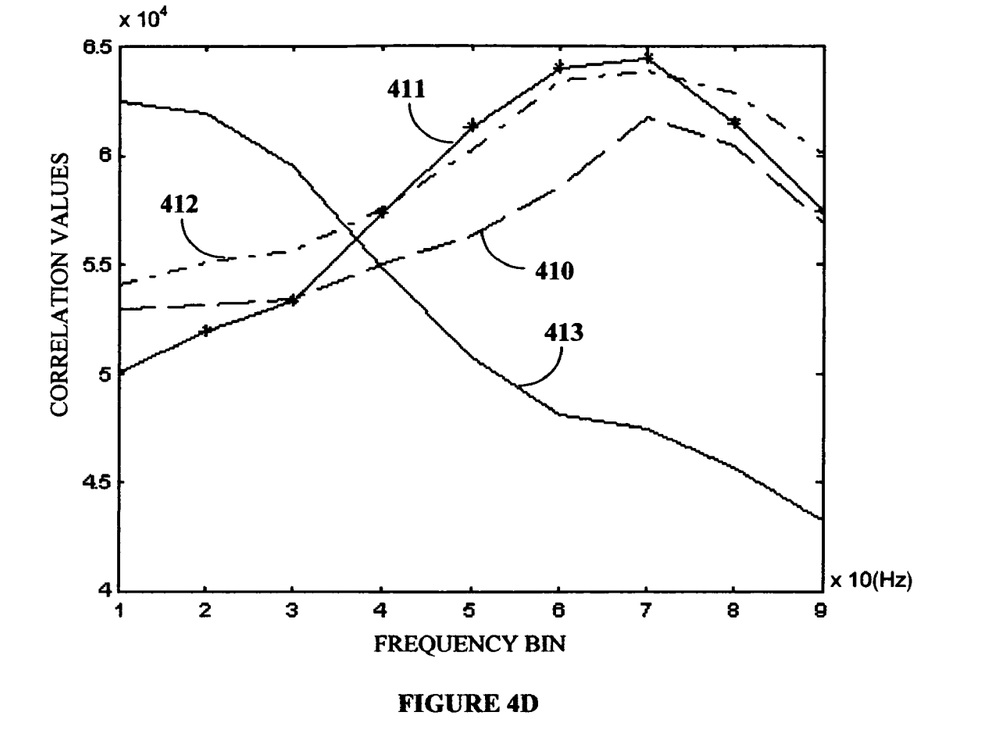
FIG. 4D illustrates an example of the frequency response correlation histogram generated by correlation of a weak satellite signal with the incoming GPS signal, generated at a high frequency resolution around the tracking frequency at each chip delay at which auto-correlation and cross-correlation peaks occur in FIG. 3C.

FIG. 4D illustrates an example of frequency response correlation histograms drawn for the correlation peaks that occur at different chip delays within the frequency search window. In this example, the frequency response correlation histograms 410, 411, 412 and 413 are plotted for correlation peaks 310, 311, 312 and 313 respectively, and at sample delays 2741, 2750, 2764 and 2774 respectively. It is observed that the frequency response correlation histograms 410, 411 and 412 have a similar pattern, while the correlation histogram 413 has a different pattern from the remaining histograms. In particular, frequency response correlation histograms 410, 411 and 412 have maximum values in the vicinity of the $7^{th}$ frequency bin, which is at a distance of 70 Hz from the beginning of the frequency search window (X-axis). However, correlation histogram 413 has a maximum value at the $1^{st}$ frequency bin, which is at the beginning of the frequency search window. It is also observed that the frequency response correlation histograms 410, 411 and 412 have their maximum values in the vicinity of the $7^{th}$ frequency bin, which is similar to the positioning of maximum value of the strong satellite's frequency response correlation histogram 409. From these observations, it can be concluded that the correlation peaks 310, 311 and 312 are due to the strong satellite signal, and more importantly, the correlation peak 313 is due to the weak signal and is the desired auto-correlation peak.

Figure 5:
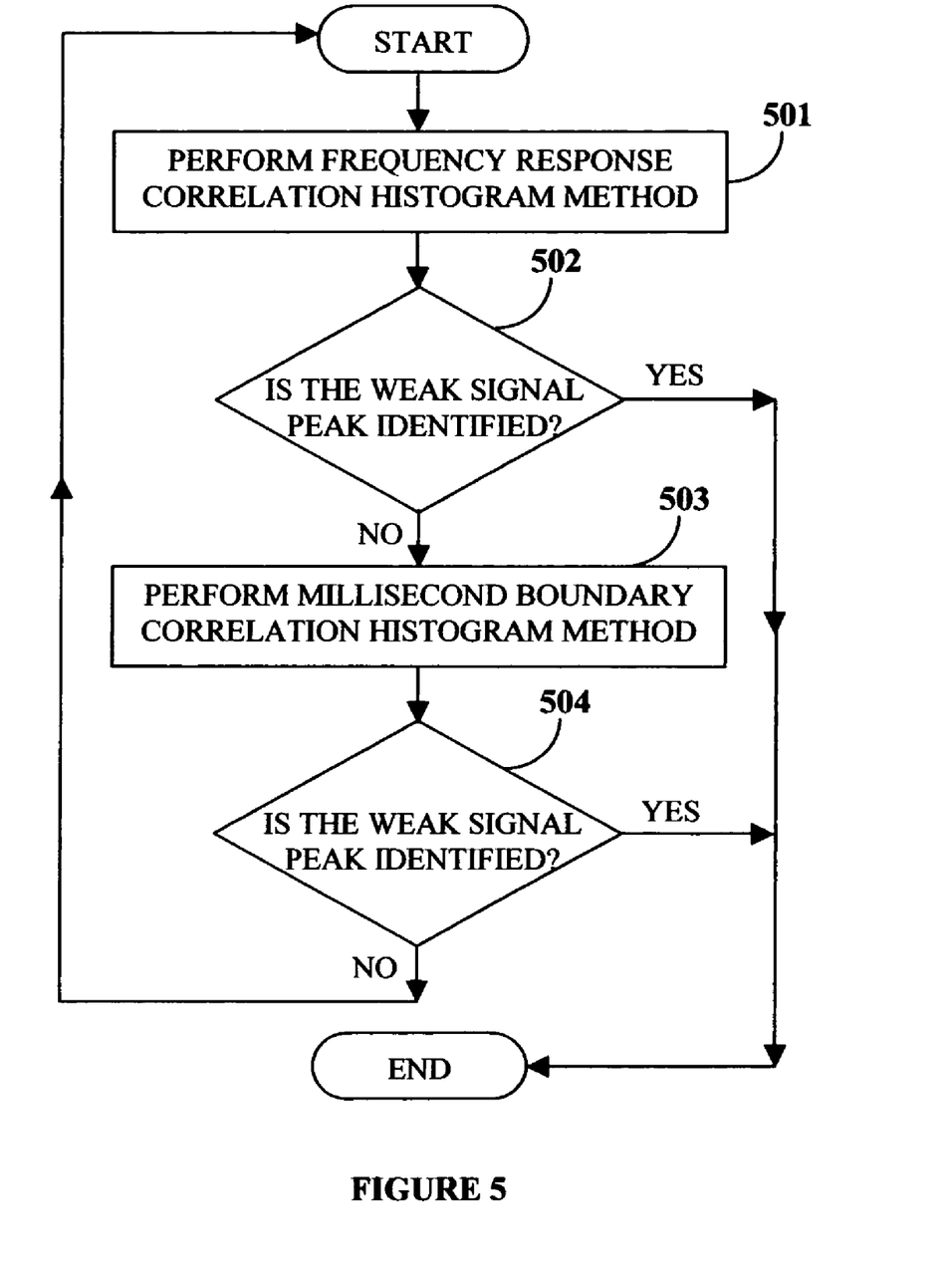
FIG. 5 illustrates the method of weak satellite signal acquisition in a receiver in the presence of an interfering strong satellite signal using a combination of the millisecond boundary correlation histogram method and/or the frequency response correlation histogram method.

FIG. 5 illustrates the method of acquiring a weak satellite signal at a GPS receiver, in the presence of an interfering strong satellite signal in a global positioning system using a combination of the millisecond boundary correlation histogram method and the frequency response correlation histogram method.

For weak signal acquisition, the frequency response correlation histogram method is used to detect the correlation peak 501. In those situations where the Doppler frequencies of the strong satellite and the weak satellite are very close, for example, having a difference of about 20 Hz, the frequency response correlation histogram method will not be able to distinguish the weak satellite signal auto-correlation peak from the strong satellite signal cross-correlation peaks. If the difference in Doppler frequencies of the strong and weak satellite signals is much greater than 20 Hz, the frequency response correlation histogram method will be able to detect the auto-correlation peak. Whether the frequency response correlation histogram is able to detect the autocorrelation peak 502 is first determined. If the frequency response correlation histogram method is unable to detect the auto correlation peak, the millisecond boundary correlation histogram method 503 is applied. If the millisecond boundary correlation histogram method is also unable to detect the autocorrelation peak 504, then the frequency response correlation histogram method is repeated. Since, the satellite Doppler varies over time even if the first attempt of detecting the autocorrelation peak fails, one of the methods will be able to detect the weak satellite signal within a finite period of time.

INDUSTRIAL APPLICATION

The proposed invention can be used to detect a weak PRN signal in the presence of a strong PRN signal, wherein the former is partially masked by the latter in a PRN receiver. The weak signal can be detected efficiently by using the proposed method and the apparatus embodied in this invention. This invention can be applied for GPS-application in an indoor or masked signal environment.

While one or more embodiments of the present invention have been described in the specification, those skilled in the art will recognize that changes and modifications may be made thereto without departing from the spirit of the invention, and it is intended to claim all such changes and modifications that fall within the scope of the invention.

We claim:

1. A method of acquisition of a weak satellite signal from a satellite, in the presence of an interfering strong satellite signal from another satellite in a global positioning system receiver, comprising the steps of:

identifying said strong interfering satellite signal that causes cross-correlation;

determining millisecond boundary correlation histogram for said incoming strong interfering satellite signal, wherein the millisecond boundary correlation histogram is derived by determining and integrating correlation values starting from different millisecond boundaries for a navigation data bit;

correlating and integrating a locally generated code representing said weak satellite signal with the incoming signal at different predefined chip delays for an extended period of time, thereby identifying the chip delays at which the correlation peaks occur;

generating millisecond boundary correlation histograms for navigation data bit at each of said identified chip delays at which correlation peaks occur;

identifying a histogram with a unique peak from amongst the multiple correlation histograms generated, wherein said histogram corresponds to correlation peak due to the weak satellite signal; and selecting the weak satellite signal for acquisition.

2. A method of acquisition of a weak satellite signal from a satellite, in the presence of an undesirable strong interfering satellite signal from another satellite in a global positioning system receiver, comprising the steps of:

identifying said strong satellite signal that causes cross correlation;

determining frequency response correlation histogram of the strong satellite signal with a high frequency resolution around the tracking frequency, wherein said frequency response correlation histogram is derived by integrating over time the correlation values as a result of changing the local carrier at small steps around the tracking frequency;

correlating and integrating the locally generated code representing the weak satellite signal with the incoming satellite signal at different predefined chip delays for an extended period of time, thereby identifying the chip delays at which the autocorrelation and cross correlation peaks occur;

generating frequency response correlation histograms at each of said identified chip delays at which correlation peaks occur;

identifying a histogram with a unique peak from amongst the multiple frequency response correlation histograms generated, wherein said histogram corresponds to correlation peak due to the weak satellite signal; and selecting the weak satellite signal for acquisition.

3. A method of acquisition of a weak satellite signal from a satellite, in the presence of an undesirable strong interfering satellite signal from another satellite in a global positioning system receiver, comprising the steps of:

performing frequency response correlation histogram method and millisecond boundary correlation histogram method successively and iteratively until the weak satellite signal peak is successfully identified, wherein the step of performing the frequency response correlation histogram method further comprises the steps of:

identifying said strong satellite signal that causes cross correlation;

determining the frequency response correlation histogram of the strong satellite signal with a high frequency resolution around the tracking frequency, wherein said frequency response correlation histogram is derived by integrating over time the correlation values as a result of changing the local carrier at small steps around the tracking frequency;

correlating and integrating the locally generated code representing the weak satellite signal with the incoming satellite signal, at different predefined chip delays for an extended period of time, and thereby identifying the chip delays at which the autocorrelation and cross correlation peaks occur;

generating frequency response correlation histograms at each of said identified chip delays at which correlation peaks occur;

identifying a histogram with a unique peak from amongst the multiple frequency response correlation histograms generated, wherein said histogram corresponds to correlation peak due to the weak satellite signal; and selecting the weak satellite signal for acquisition; and wherein the step of performing the millisecond boundary correlation histogram method further comprises the steps of:

identifying said strong interfering satellite signal that causes cross correlation;

determining the millisecond boundary histogram for said incoming strong interfering satellite signal, wherein the millisecond boundary correlation histogram is derived by determining and integrating correlation values starting from different millisecond boundaries for a navigation data bit;

correlating and integrating the locally generated code representing said weak satellite signal with the incoming signal, at different predefined chip delays for an extended period of time, and thereby identifying the chip delays at which the correlation peaks occur;

generating millisecond boundary correlation histograms for navigation data bit at each of said identified chip delays at which correlation peaks occur;

identifying a histogram with a unique peak from amongst the multiple correlation histograms generated, wherein said histogram corresponds to correlation peak due to the weak satellite signal; and selecting the weak satellite signal for acquisition.

4. The method of claim 1, wherein the correlation involves the accumulation of correlation values for an extended period of time, in the order of several seconds, by continuous integration without discarding the prior data, for the search of progressively weaker signals.

5. The method of claim 1, wherein the step of generating millisecond boundary correlation histograms, occurs in a simultaneous chip frequency time multiplexed search.

6. The method of claim 1, wherein the correlation histogram is drawn for all the correlation peaks by integrating the correlation values for the extended integration period, and by delaying the start of integration by 1 millisecond each time until the end of the navigation data bit period.

7. The method of claim 2, wherein the correlation involves the accumulation of correlation values for an extended period of time, in the order of several seconds, utilizing prior correlation data and allowing accumulation of correlation values until the correlation peaks of the correlation histogram stand out from the noise floor.

8. The method of claim 2, wherein the step of generating frequency response correlation histograms occurs in a simultaneous chip frequency time multiplexed search.

9. The method of claim 2, wherein the frequency response correlation histogram is drawn for all the correlation peaks by integrating the correlation values for the extended integration period, and by changing the local carrier at small steps around the tracking frequency.

10. A global positioning system receiver for detecting a desired weak satellite signal in the presence of a strong interfering satellite signal, comprising:

a radio frequency down converter;

a navigation processor;

a communication controller that receives information regarding weak signal satellite identification, Doppler frequency search range and chip delay search range from said navigation processor;

a chip-frequency-time multiplexed correlator array that is operated in a time multiplexed manner for different sets of frequency range and code delay range, simultaneously generating the correlation values by continuous integration and peak examination, without discarding the prior data, at desired chip and frequency ranges for the strong interfering signal and weak desired signal, and thereafter creating the millisecond boundary correlation histogram and frequency response correlation histogram, wherein the millisecond boundary correlation histogram is derived by determining and integrating correlation values starting from different millisecond boundaries for a navigation data bit, and wherein said frequency response correlation histogram is derived by integrating over time the correlation values as a result of changing the local carrier at small steps around the tracking frequency; and a chip frequency time multiplexed controller that programs said chip, frequency and time multiplexed correlator array.

11. The global positioning system receiver of claim 10, wherein the array of blocks within the chip frequency time multiplexed correlator array is shared between chip delay searches and Doppler frequency searches.

12. The global positioning system receiver of claim 11, wherein in successive modes of operation, said blocks are programmable and generate Doppler frequencies at different offsets and generate simultaneous chip delays, thereby enabling search in different frequency steps and chip delays simultaneously.

* * * * *